United States Patent [19]

Graham

[11] Patent Number: 4,862,831
[45] Date of Patent: Sep. 5, 1989

[54] ISOLATION CABINET

[76] Inventor: Peter B. Graham, 105 Sandy Point Road, Somers, Victoria, 3927, Australia

[21] Appl. No.: 82,865
[22] PCT Filed: Sep. 29, 1986
[86] PCT No.: PCT/AU86/00281
§ 371 Date: Jul. 27, 1987
§ 102(e) Date: Jul. 27, 1987
[87] PCT Pub. No.: WO87/01966
PCT Pub. Date: Apr. 9, 1987

[30] Foreign Application Priority Data

Sep. 30, 1985 [AT] Austria .................................. PH2671

[51] Int. Cl.⁴ .............................................. A01K 1/00
[52] U.S. Cl. .................................................... 119/15
[58] Field of Search ...................... 119/30, 31, 32, 33, 119/35, 37, 38, 39, 15, 21, 22; 128/1 R, 1 B

[56] References Cited

U.S. PATENT DOCUMENTS

| | | | |
|---|---|---|---|
| 1,201,781 | 10/1916 | Whan | 119/35 |
| 3,265,059 | 8/1966 | Matthews | 128/1 R |
| 3,272,199 | 9/1966 | Matthews | 128/1 R |
| 3,464,389 | 9/1969 | Seiderman | 119/22 |
| 3,492,987 | 2/1970 | Parker | 128/1 R |
| 3,529,590 | 9/1970 | Grosholz | 128/1 B |
| 3,585,968 | 6/1971 | Stone, Jr. | 119/22 |
| 4,201,154 | 5/1980 | Gowrie | 119/15 |
| 4,202,676 | 5/1980 | Pelosi, Jr. et al. | 128/1 R X |

Primary Examiner—Gene Mancene
Assistant Examiner—R. Thomas Price
Attorney, Agent, or Firm—Fred A. Keire

[57] ABSTRACT

A long term isolation cabinet microbiologically secure with high isolation integrity with an isolation device and waste removal apparatus commensurate thereto for isolation such as laboratory animals or chicks.

5 Claims, 5 Drawing Sheets

ISOLATION CABINET

TECHNICAL FIELD

This invention relates to isolation cabinets for housing living creatures in an environment having a high degree of micro-biological security.

The invention has arisen to satisfy a specific need for isolation cabinets to house poultry from day old chicks to approximately ten weeks of age but it will be appreciated from the ensuing description that the same or similar cabinets could be used for housing other living creatures such as mice, rats and other laboratory animals which must be kept in micro-biological isolation.

DISCLOSURE OF THE INVENTION

The invention provides an isolation cabinet to house at least one living creature, comprising;

a cabinet defining an interior chamber to receive the living creature;

an air inlet for admission of air into the chamber; and an air outlet for outlet of air from the chamber; and forced airflow means operable to force an airflow through the chamber via the air inlet and air outlet.

Preferably the air inlet is provided with an air purification filter.

Preferably too the air outlet is also fitted with an air purification filter.

Preferably further, the forced airflow means comprises a fan fitted to the air inlet and operable to force air through the chamber and/or a fan fitted to the outlet and operable to draw air through the chamber.

With a single fan fitted to the air inlet, the fan may be operable to maintain during said airflow a positive pressure within the chamber compared with atmospheric pressure. A fan fitted to the outlet may be operable to maintain during said airflow a negative pressure compared with atmospheric pressure.

The construction may be such that a single fan can be interchangeably fitted either to the inlet or to the outlet to permit operation with either a positive pressure within the chamber or with a negative pressure compared with atmospheric pressure. Alternatively separate fans may be fitted to the inlet and the outlet.

The cabinet body may be fitted with at least one observation window and at least one glove port for handling a creature within the chamber.

The cabinet may also comprise a transfer chamber fitted with sealable inner and outer doors opening respectively to the interior chamber and to the exterior of the cabinet and means to purge the interior of the transfer chamber to the air outlet.

The bottom of the interior chamber of the cabinet may be provided with means to collect excreta from the creatrue and to transfer that excreta to a sump in the bottom of the chamber. The bottom of the chamber may be provided with a mesh floor and the means to collect and transfer the excreta may comprise means to hold film material such that it extends across the bottom of the interior chamber beneath the mesh floor to catch excreta and to enable the film to be drawn into the sump. A pass out port may be provided to enable the film and excreta to be withdrawn from the sump without disrupting the isolation of the interior chamber.

BRIEF DESCRIPTION OF THE DRAWINGS

In order that the invention may be more fully explained, one particular embodiment will be described in some detail with reference to the accompanying drawings in which.

BEST MODE OF CARRYING OUT THE INVENTION

Figure 1:
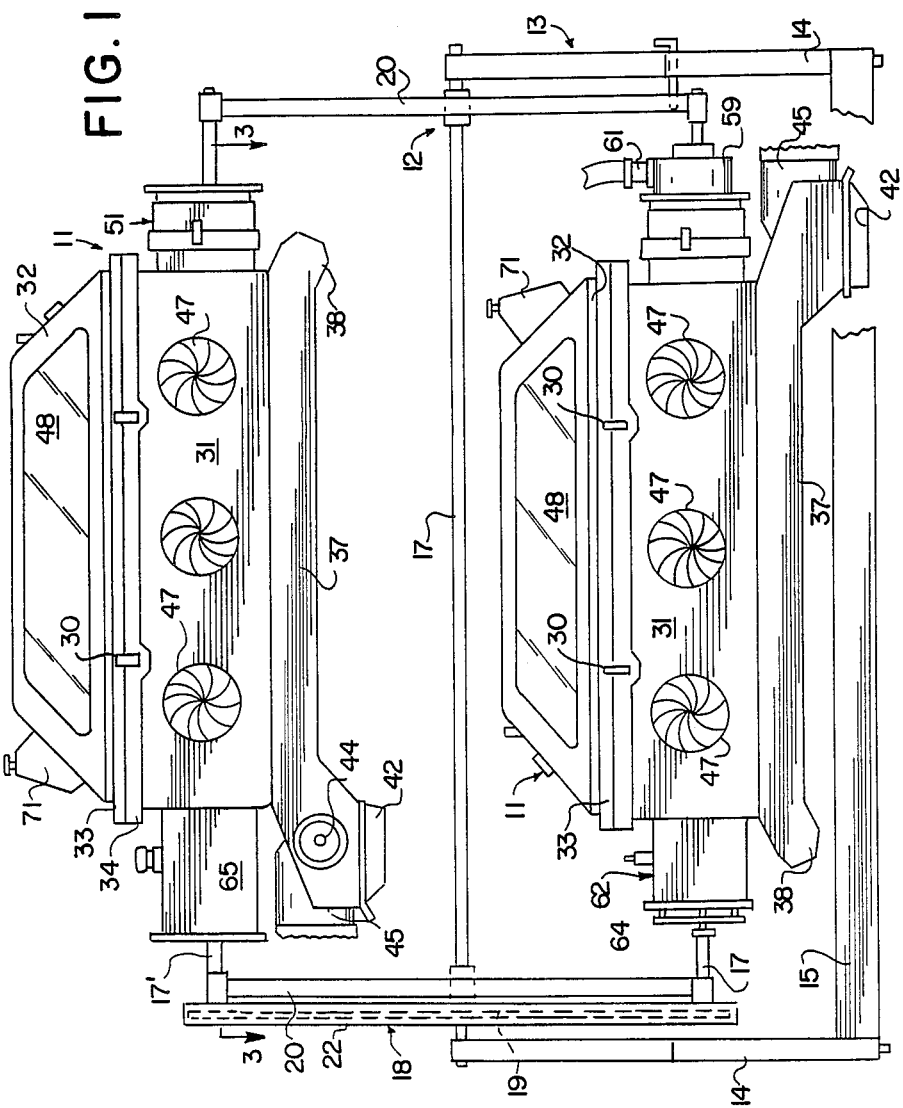
FIG. 1 is a side elevation of a pair of isolation cabinets constructed in accordance with the invention and mounted on a pivoting support.
Figure 2:
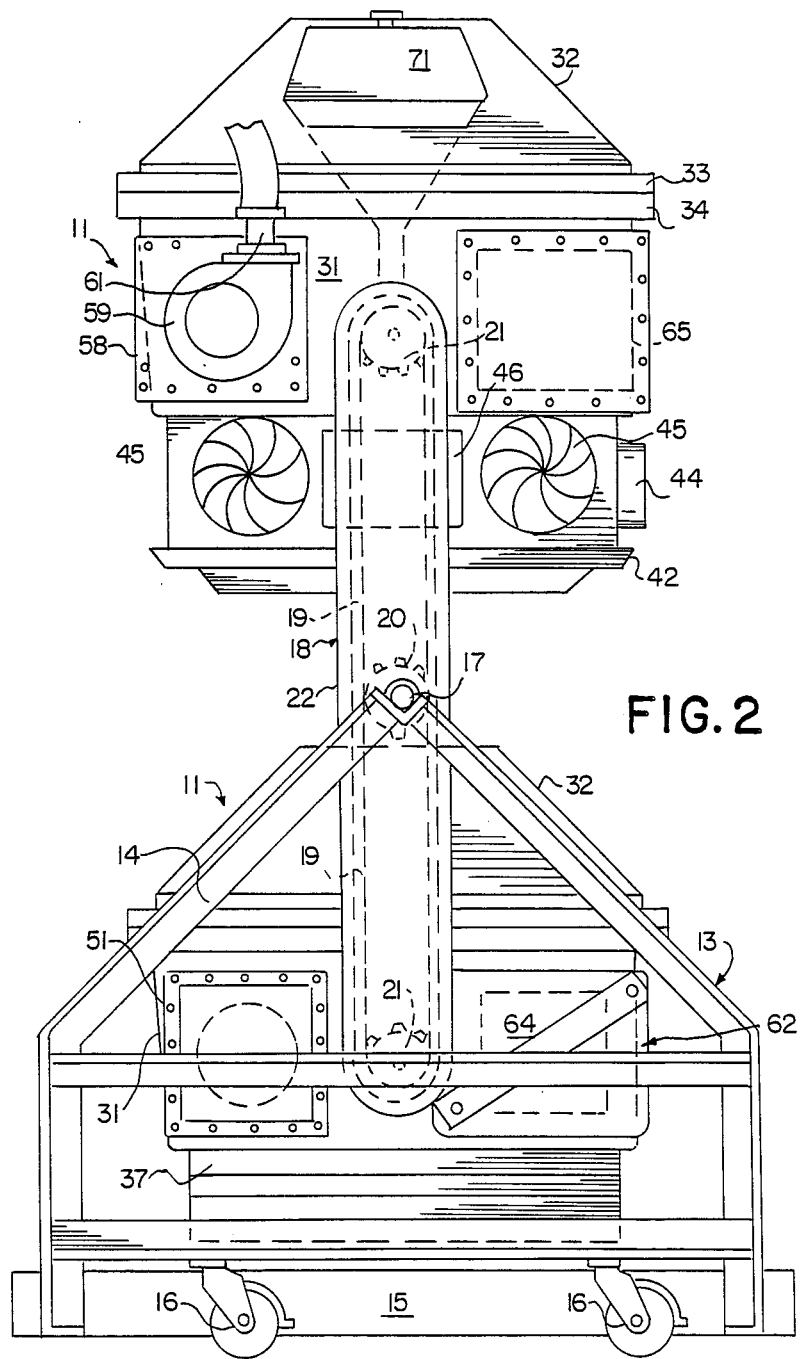
FIG. 2 is an end elevation of the isolation cabinets shown in FIG. 1.
Figure 3:
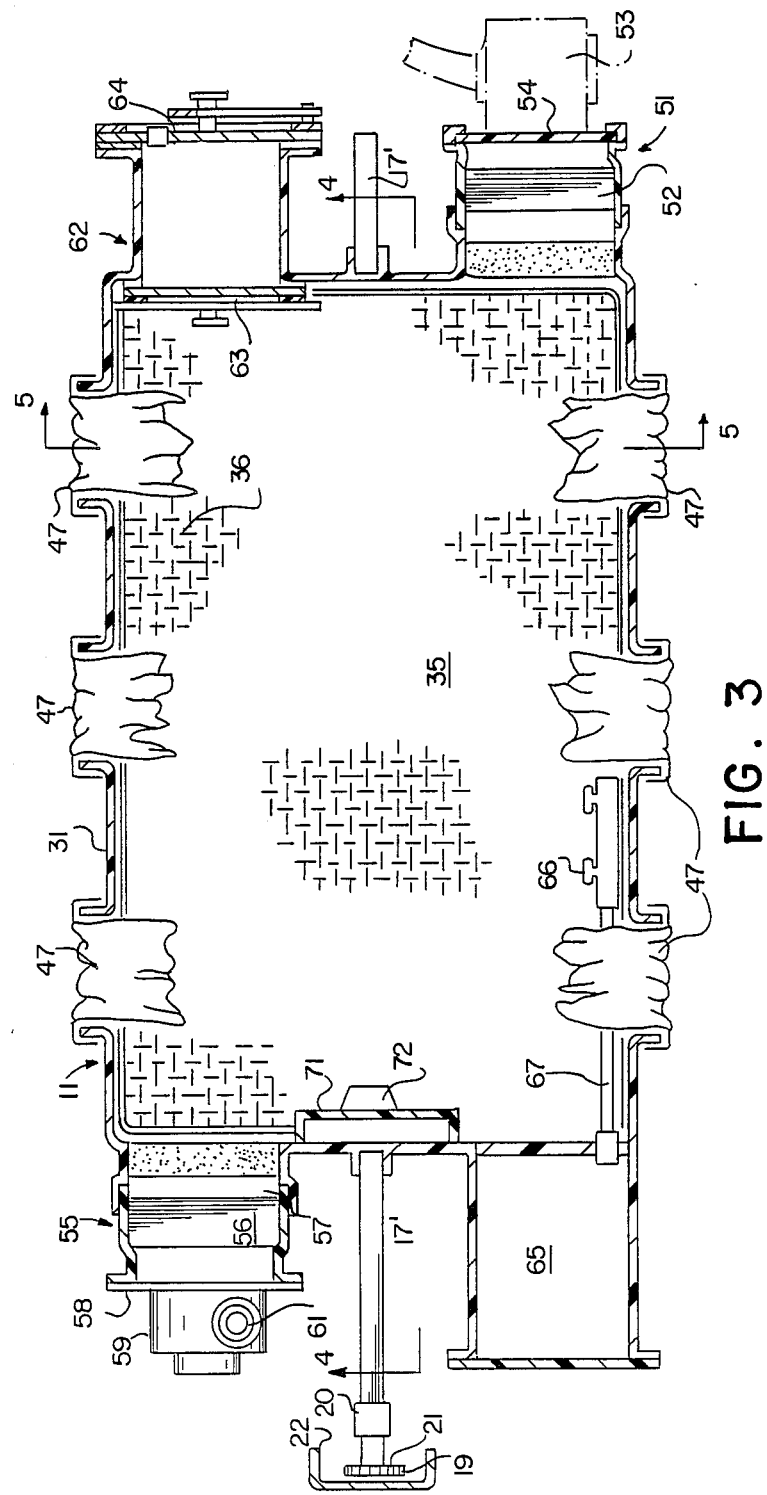
FIG. 3 is a cross-section on the line 3—3 in FIG. 1.
Figure 4:
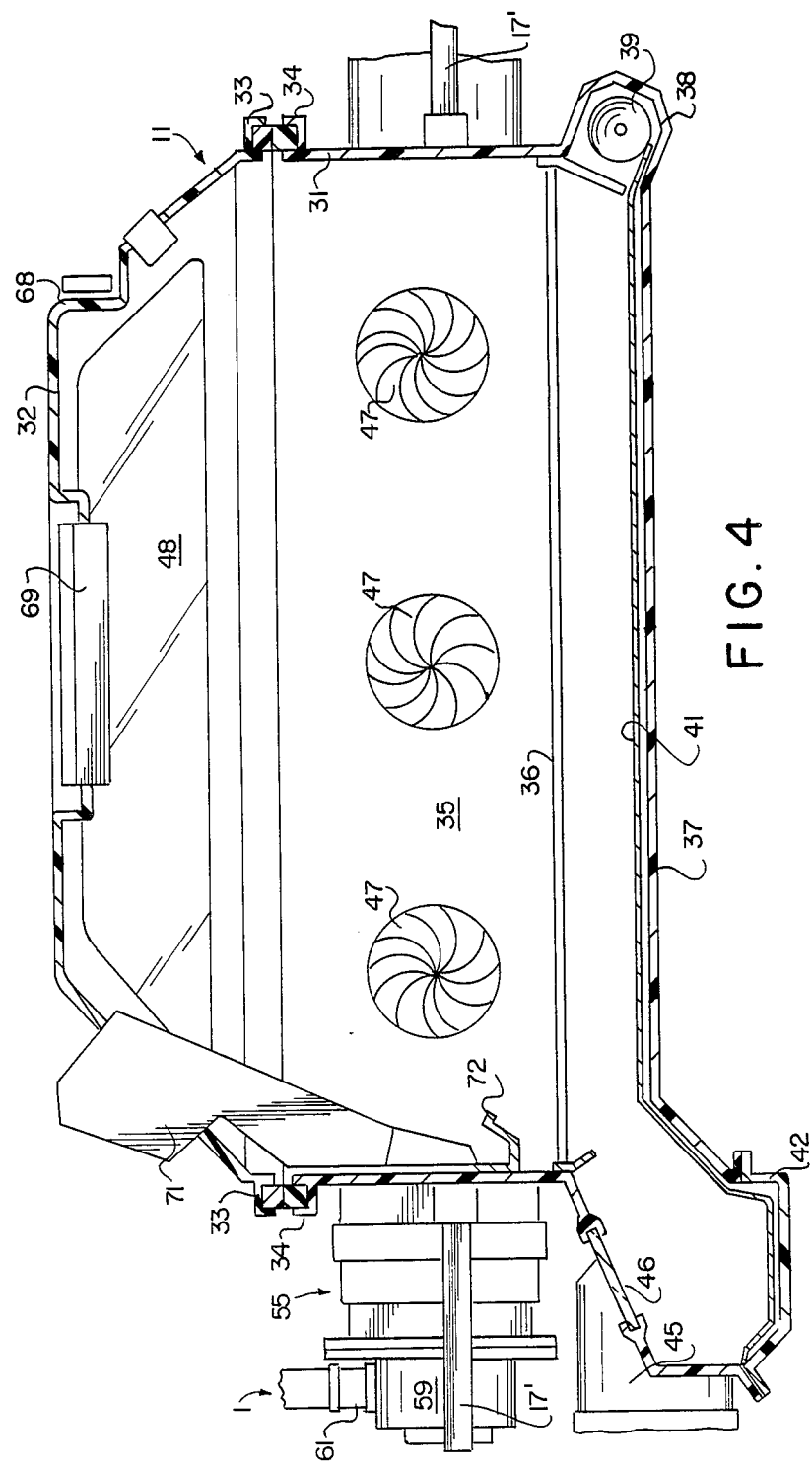
FIG. 4 is a cross-section on the line 4—4 in FIG. 3.
Figure 5:
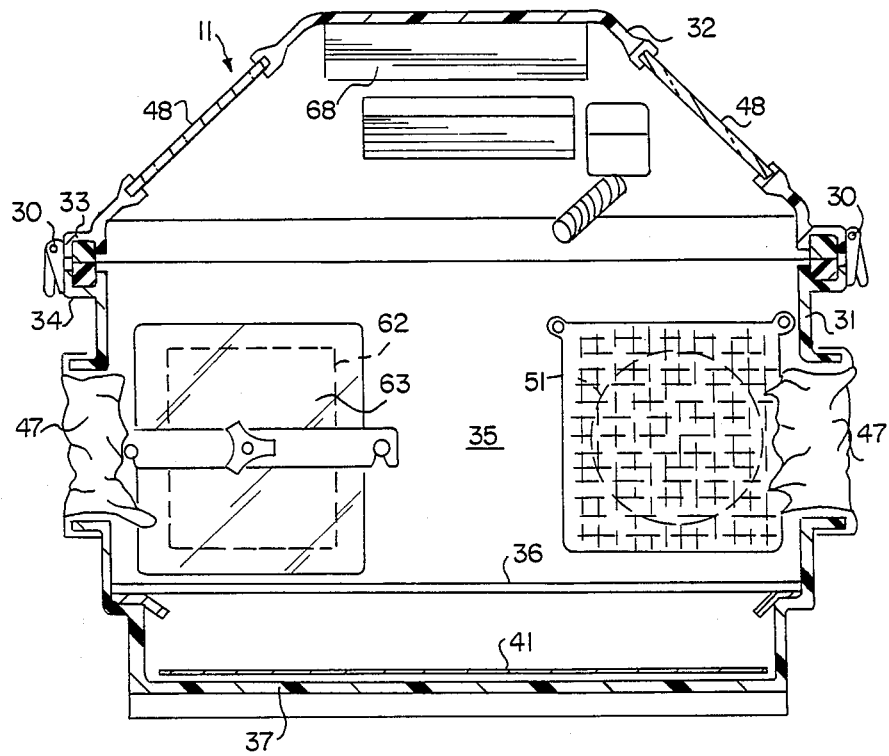
FIG. 5 is a cross-section on the line 5—5 in FIG. 3.

The drawings illustrate an isolation cabinet installation comprising a pair of isolation cabinets denoted generally as 11 which are carried on a swinging support frame 12 pivotally mounted on a main cradle frame 13. Cradle frame 13 comprises a pair of cradle ends 14 interconnected by a cranked lower bar 15. It is provided with wheels 16 so that the complete installation can be readily moved into a required location.

A fixed axle 17 extends between the upper ends of the cradle ends 14 and carries the swinging frame 12. Frame 12 comprises two end arms 20 rotatable on the axle 17 and provided at their outer ends with stub axles 17' which carry the isolation cabinets 11.

When the arms 20 of the swinging frame 12 are vertical, the isolation cabinets are held one above the other such that the upper cabinet is at a convenient height for inspection. Typically the upper part of the upper cabinet will be at eye level for an average person. By swinging the swinging support frame 12 on its cradle mountings, the general positions of the two cabinets can be reversed so that the lower cabinet swings into the upper position and vice versa.

A sprocket and chain system denoted generally as 18 is provided to maintain the isolation cabinets at a constant attitude relative to the support frame, and therefore the ground, during such swinging movements. The sprocket and chain system 18 may comprise a chain 19 engaging a central sprocket 20a fixed to the central mounting axle 17 and an outer pair of sprockets 21 fixed to two of the stub axles 17' of the isolation cabinets. A channel shaped guard 22 may be fitted around the chain and sprocket system.

Each isolation cabinet 11 comprises a main body portion 31 and a roof portion 32 moulded of a suitable plastics material such as glass reinforced plastic, (GRP), polyvinyl chloride, polyethylene or polypropylene. These two body portions have opposing flanges 33, 34 and are clamped firmly together about a neoprene sealing gasket by means of over-centre clamps 30 operating on these flanges.

The cabinet body portions together define a hollow interior chamber 35 which is approximately 1 metre long, 0.6 metres wide and 0.65 metres high. A wire mesh floor 36 is supported approximately 200 millimetres above the base 37 of the cabinet and this may be provided with a fine mesh overlay when very small chickens are to be housed in the cabinet.

The base part of the main body portion 31 is formed at one end with a compartment 38 which houses a roll 39 of polyethylene film. The film 41 from this roll is extended across the base of the chamber immediately beneath the mesh floor 36 to collect excreta and litter from the housed birds. When sufficiently soiled, the film is drawn into a drained sump 42 formed in a mouled compartment 43 moulded into the base of the cabinet body at its end remote from the compartment 38. This compartment is provided with a sealed pass-out port 44 to enable disposal of soiled film collected in the sump.

Access is gained to the under-floor area of the compartment via glove ports 45 adjacent to the pass-out port. A viewing window 46 is also provided at this end of the cabinet body.

Additional glove ports 47 are provided in either side of the main cabinet body portion for handling the birds and the roof portion 32 incorporates two veiwing windows 48 to ensure an adequate view of the birds during such handling.

One end of the cabinet has an air inlet denoted generally as 51 comprising a filter compartment fitted with a high efficiency particulate air (HEPA) filter 52 to purify incoming air. An air inlet fan 53 is mounted in a removable plenum 54 attached to the filter chamber. The fan can be removed and replaced without compromising the environment in the cabinet.

The other end of the cabinet has an air outlet denoted generally as 55 which is generally similar to the air inlet in that it has a high efficiency air purification filter 56 mounted within an exhaust filter chamber 57 to which there is attached an exhaust plenum 58 housing an exhaust fan 59 and provided with an air outlet valve 61 for connection to an exhaust manifold.

In a typical installation the isolation cabinet will be installed within a room which is supplied with filtered and air conditioned air. Inlet air is drawn from the conditioned room air through the air inlet and is filtered by the high efficiency inlet filter 52. Air flows from the cabinet through the exhaust filter 57 and is normally discharged to the atmosphere via an exhaust manifold extending outside the building. Separate inlet and outlet fans may be provided or a single fan may be interchangeable between the inlet and outlet. Air is forced through the inlet or drawn through the outlet so as to maintain within the cabinet a constant pressure which may be positive or negative relative to atmospheric pressure according to the requirements of the particular experimental program. In programs in which the cabinet houses poultry, roughing filters may be provided in advance of the exhaust filter to remove fluff and dust from air passing to the exhaust filter. Manometers or other devices are fitted to monitor internal pressure and pressure drops across the exhaust filter to indicate its condition.

The cabinet body is provided with a transfer chamber 62 adjacent to the outlet filter. This chamber is fitted with sealed inner and outer doors 63, 64 and can be purged to the air outlet via appropriate tubing. Access to the interior of the cabinet to remove birds or other material is obtained by opening the outer and inner doors after treatment of the enclosed space with paracetic acid or other disinfectant.

A water tank 65 is attached to the outer wall of the cabinet adjacent to the inlet filter compartment and feeds water to a drinking cup system 66 via tubing 67.

The roof moulding 32 is formed with a housing 68 for mounting an electrical control box and sealed glands are fitted to the cabinet body for the entry of cables and controls to an electric heater and circulation fan mounted internally. A fluorescent light 69 is provided internally for illumination and black out covers can be provided if necessary. A feed hopper 71 feeds grain to a feed trough 72 location within the cabinet.

INDUSTRIAL APPLICATION

The illustrated cabinets enable chickens to be housed in a biologically isolated environment for long periods. They may be kept under positive or negative pressure compared with atmospheric pressure and they can readily be examined at all times. However, the illustrated cabinets are advanced by way of example only and could be modified considerably. For example, the cabinet body could be modified so that one side wall (incorporated two glove ports) is removable. Two such cabinets could then be fitted together on removal of the side walls to produce a matching larger sized cabinet. It will be appreciated that details of the cabinet design could be varied considerably for applications in which rats, mice or larger animals are to be housed.

I claim:

1. An isolation cabinet to house small laboratory animals or chickens for extended periods of time, comprising:
    a rigid cabinet body defining an interior chamber to receive the animals or chickens and a sump in a bottom of the interior chamber;
    a perforated floor in the bottom of the interior chamber to support the animals or chickens in the chamber and separating the sump from the interior chamber;
    means within the sump to collect excreta from the animals or chickens falling through the perforated floor;
    an air inlet for admission of air into the chamber;
    an air outlet for outlet of air from the chamber to an exhaust extension to the cabinet;
    forced flow air flow means operable to force an air flow through the chamber via the air inlet and air outlet directly to the exhaust;
    an observation window in the cabinet body for viewing the interior of the chamber;
    at least one glove port in the cabinet body for handling said small laboratory animals or chickens in the chamber; and
    a transfer chamber formed by the cabinet body adjacent the interior chamber and fitted with sealable inner and outer door openings, respectively, to the interior chamber and to the exterior of the cabinet.

2. An isolation cabinet to house at least one living creature, comprising:
    a rigid cabinet body defining an interior chamber to receive the living creature;
    an air inlet for admission of air into the chamber;
    an air outlet for outlet of air from the chamber to an exhaust extenstion to the cabinet;
    forced flow air flow means operable to force an air flow through the chamber via the air inlet and the air outlet directly to the exhaust;
    an observation window in the cabinet body for viewing the interior of the chamber;
    at least one glove port in the cabinet body for handling said creature in the chamber;
    a sump formed by the cabinet body in the bottom of the interior chamber;
    a perforated floor in the bottom of the interior chamber;
    film holder means to hold film material such that it extends across the bottom of the interior chamber beneath the perforated floor to chatch excreta of the living creature and to enable the film to be drawn into the sump; and a sump pass-out port to enable film and excreta to be withdrawn from the sump without disrupting the isolation of the interior chamber.

3. An isolation cabinet to house at least one living creature, comprising:
   a rigid cabinet body defining an interior chamber to receive the living creature;
   an air inlet for admission of air into the chamber;
   an air outlet for outlet of air from the chamber to an exhaust extension to the cabinet;
   forced flow air flow means operable to force an air flow through the chamber via the air inlet and air outlet directly to the exhaust;
   an observation window in the cabinet body for viewing the interior of the chamber;
   at least one glove port in the cabinet body for handling said creature in the chamber;
   a transfer chamber formed by the cabinet body adjacent the interior chamber and fitted with sealable inner and outer door openings, respectively, to the interior chamber and to the exterior of the cabinet;
   a sump formed by the cabinet body in the bottom of the interior chamber;
   a perforated floor in the bottom of the interior chamber;
   film holder means to hold film material such that it extends across the bottom of the interior chamber beneath the perforated floor to catch excreta of the living creature and to enable the film to be drawn into the sump; and
   a sump pass-out port to enable film and excreta to be withdrawn from the sump without disrupting the isolation of the interior chamber.

4. An isolation cabinet installation comprising:
   a base structure;
   a swinging cabinet support mounted on the base structure for swinging movement about a generally horizontal axis;
   at least two isolation cabinets pivotally mounted on the swinging cabinet support for pivoting movement relative to the cabinet support, said isolation cabinet comprising:
      a rigid cabinet body defining an interior chamber to receive the living creature;
      an air inlet for admission of air into the chamber;
      an air oulet for outlet of air from the chamer to an exhaust extension to the cabinet;
      forced flow air means operable to force an air flow through the chamber via the air inlet and air outlet directly to the exhaust;
      an observation window in the cabinet body for viewing the interior of the chamber;
      at least one glove port in the cabinet body for handling said creature in the chamber; and
      a transfer chamber formed by the cabinet body adjacent the interior chamber fitted with sealable inner and outer door openings, respectively, to the interior chamber and to the exterior of the cabinet;
   a sump formed by the cabinet body in the bottom of the interior chamber;
   a perforated floor in the bottom of the interior chamber;
   film holder means to hold film material such that it extends across the bottom of the interior chamber beneath the perforated floor to catch excreta of the living creature and to enable the film to be drawn into the sump; and
   a sump pass-out port to enable film and excreta to be withdrawn from the sump without disrupting the isolation of the interior chamber.

5. An isolation cabinet installation comprising:
   a base structure;
   a swinging cabinet support mounted on the base structure for swinging movement about a generally horizontal axis;
   at least two isolation cabinets pivotally mounted on the swinging cabinet support for pivoting movement relative to the cabinet support, each said isolation comprising:
      a rigid cabinet body defining an interior chamber to receive small laboratory animals or chickens for extended periods of time;
      a sump in the bottom of the interior chamber;
      a perforated floor in the bottom of the interior chamber to support the animals or chickens in the chamber and separating the sump from the interior chamber;
      means within the sump to collect excreta from the animals or chickens falling through the perforated floor;
   an air inlet for admission of air into the chamber;
   an air outlet for outlet of air from the chamber to an exhaust extension to the cabinet;
   forced flow air flow means operable to force an air flow through the chamber via the air inlet air outlet directly to the exhaust;
   an observation window in the cabinet body for viewing the interior of the chamber;
   at least one glove port in the cabinet body for handling said creature in the chamber;
   a transfer chamber formed by the cabinet body adjacent the interior chamber and fitted with sealable inner and outer door openings, respectively, to the interior chamber and to the exterior of the cabinet; and
   cabinet attitude control means interconnecting the cabinets and effective to maintain the attitude of each cabinet constant relative to the ground on swinging movement of the cabinet support, the swinging cabinet support being selectively moveable inbetween a position in which the cabinets are supported one above the other and an inverted position in which the positions of the cabinets are interchanged.

* * * * *